United States Patent
Haga et al.

(10) Patent No.: US 7,828,919 B2
(45) Date of Patent: Nov. 9, 2010

(54) METHOD FOR MANUFACTURING MULTILAYER CERAMIC ELECTRONIC COMPONENT AND MULTILAYER CERAMIC ELECTRONIC COMPONENT

(75) Inventors: Daisuke Haga, Yasu (JP); Yoichiro Ito, Echi-gun (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/103,089

(22) Filed: Apr. 15, 2008

(65) Prior Publication Data
US 2008/0199724 A1 Aug. 21, 2008

Related U.S. Application Data

(63) Continuation of application No. PCT/JP2007/055626, filed on Mar. 20, 2007.

(30) Foreign Application Priority Data
Apr. 5, 2006 (JP) .............................. 2006-104454

(51) Int. Cl.
*C03B 29/00* (2006.01)
*B31B 1/60* (2006.01)
*B44C 1/165* (2006.01)
*B44C 1/17* (2006.01)
*B29C 65/00* (2006.01)
*B32B 7/00* (2006.01)
*B32B 9/00* (2006.01)

(52) U.S. Cl. .................... 156/89.11; 156/89.12; 156/60; 156/230; 156/241; 156/247; 156/256; 156/310; 428/688

(58) Field of Classification Search ................. 428/688; 156/89.11

See application file for complete search history.

(56) References Cited

U.S. PATENT DOCUMENTS

| 3,999,004 A | * | 12/1976 | Chirino et al. ............... 174/257 |
| 5,021,287 A | * | 6/1991 | Otagiri et al. ................ 428/212 |
| 2006/0037690 A1 | * | 2/2006 | Ishiyama et al. ......... 156/89.11 |

FOREIGN PATENT DOCUMENTS

JP 01-125912 A 5/1989

(Continued)

OTHER PUBLICATIONS

Official communication issued in the International Application No. PCT/JP2007/055626, mailed on Jul. 3, 2007.
Official Communication issued in corresponding Korean Patent Application No. 10-2008-7007265, mailed on Jan. 29, 2010.
Official Communication issued in corresponding Japanese Patent Application No. 2008-510821, mailed on May 18, 2010.

(Continued)

*Primary Examiner*—Philip C Tucker
*Assistant Examiner*—Alex Efta
(74) *Attorney, Agent, or Firm*—Keating & Bennett, LLP

(57) ABSTRACT

A method for manufacturing a multilayer ceramic electronic component can prevent the occurrence of bubble trapping. In the method, when an external layer ceramic green sheet is pressure-bonded, for example, to a sheet made of a good quality paper having a rough surface, which is placed on a supporting member, followed by peeling off its carrier film, a first-layer ceramic green sheet is formed. The first-layer external layer ceramic green sheet uses a sterically hindered dispersing agent, such as an aryl ether polymer, as a dispersing agent. Since it is light in weight, the binder segregates at the upper side, and hence a C concentration changes in the thickness direction. More particularly, compared to a C concentration at a surface at a carrier film side supported by the carrier film, a C concentration at an open surface opposite to the surface at the carrier film side is about 1.5 to about 4.0 times.

4 Claims, 2 Drawing Sheets

FOREIGN PATENT DOCUMENTS

| | | | | |
|---|---|---|---|---|
| JP | 03-283496 | A | | 12/1991 |
| JP | 03283496 | A * | | 12/1991 |
| JP | 06-231996 | A | | 8/1994 |
| JP | 06231996 | A * | | 8/1994 |
| JP | 07-078725 | A | | 3/1995 |
| JP | 08-055754 | A | | 2/1996 |
| JP | 08055754 | A * | | 2/1996 |
| JP | 08316092 | A * | | 11/1996 |
| JP | 10-321457 | A | | 12/1998 |
| JP | 10321457 | A * | | 12/1998 |
| JP | 11-111559 | A | | 4/1999 |
| JP | 2001-307938 | A | | 11/2001 |
| JP | 2001307938 | A * | | 11/2001 |
| JP | 2002-313672 | A | | 10/2002 |
| JP | 2004-352552 | A | | 12/2004 |
| JP | 2005-082437 | A | | 3/2005 |
| JP | 2005067050 | A * | | 3/2005 |
| JP | 2005-191114 | A | | 7/2005 |
| JP | 2007-123678 | A | | 5/2007 |
| KR | 10-0884511 | | | 2/2009 |

OTHER PUBLICATIONS

Official Communication issued in corresponding Korean Patent Application No. 2008-7007265, mailed on Jul. 28, 2010.

* cited by examiner

METHOD FOR MANUFACTURING MULTILAYER CERAMIC ELECTRONIC COMPONENT AND MULTILAYER CERAMIC ELECTRONIC COMPONENT

BACKGROUND OF THE INVENTION

1. Field of the Invention

The present invention relates to a method for manufacturing a multilayer ceramic electronic component, and more particularly relates to a method for manufacturing a multilayer ceramic electronic component, which laminates ceramic green sheets supported by carrier films, and also relates to a multilayer ceramic electronic component.

2. Description of the Related Art

As a method for manufacturing a multilayer ceramic electronic component, for example, a method disclosed in Japanese Unexamined Patent Application Publication No. 6-231996 has been known. In this method, in order to prevent displacement between layers laminated to each other, a good quality paper having a rough surface is placed on a lamination support table, and ceramic green sheets supported by carrier films are then laminated to each other.

However, in this manufacturing method, since surfaces of the ceramic green sheets are flat and smooth, the adhesion between the good quality paper and a first-layer ceramic green sheet is not good enough. Hence, after the first-layer ceramic green sheet is laminated, when a carrier film supporting the above ceramic green sheet is peeled off, the high quality paper and the first-layer ceramic green sheet are peeled away from each other, and as a result, bubble trapping may occur between the high quality paper and the first-layer ceramic green sheet in some cases. The bubble trapping is a phenomenon in which air is trapped between sheets. As a result, since a location at which air is trapped rises, a ceramic green sheet and/or an internal electrode to be laminated on the above-described location is deformed, and there have been problems of short-circuiting defects and the like.

SUMMARY OF THE INVENTION

In order to overcome the problems described above, preferred embodiments of the present invention provide a method for manufacturing a multilayer ceramic electronic component, which can prevent the occurrence of bubble trapping caused by a first-layer ceramic green sheet, and a multilayer ceramic electronic component.

A method for manufacturing a multilayer ceramic electronic component, according to a preferred embodiment of the present invention, includes the steps of: forming first ceramic green sheets supported by carrier films; forming second ceramic green sheets provided with internal electrodes thereon and supported by carrier films; pressure-bonding one of the first ceramic green sheets to a supporting member and then peeling off its carrier film to form a first-layer ceramic green sheet; sequentially pressure-bonding the other first ceramic green sheets or the second ceramic green sheets to the first-layer ceramic green sheet and peeling off their carrier films so as to sequentially laminate the first ceramic green sheets and the second ceramic green sheets to form a laminate; firing the laminate to form a sintered body; and forming external electrodes on surfaces of the sintered body, wherein among the first ceramic green sheets, in the first-layer ceramic green sheet, the amount of a binder is changed in the thickness direction so that the amount at an open surface opposite to a surface at a carrier film side, which is supported by the carrier film, is larger than the amount at the surface at the carrier film side.

In addition, a multilayer ceramic electronic component, according to a preferred embodiment of the present invention, includes: a laminate including ceramic layers and internal electrode layers laminated to each other; and external electrodes provided on surfaces of the laminate, wherein a particle concentration at least one surface of the laminate is about 0.45 to about 0.90 times that inside the laminate.

By the manufacturing method according to a preferred embodiment of the present invention, the multilayer ceramic electronic component can be obtained in which the particle concentration at least one surface of the laminate is, for example, about 0.45 to about 0.90 times that inside the laminate. In addition, since the first-layer ceramic green sheet has a large amount of the binder at the open surface opposite to the surface at the carrier film side, the adhesion between a sheet placed on the supporting member and the first-layer ceramic green sheet is increased. As a result, the occurrence of bubble trapping caused by the first-layer ceramic green sheet can be prevented.

In addition, for example, in the first-layer ceramic green sheet, a C concentration (substantially indicates a volume fraction of the binder) is changed in the thickness direction so that a C concentration at the open surface opposite to the surface at the carrier film side is about 1.5 to about 4.0 times that at the surface at the carrier film side supported by the carrier film.

In addition, the first ceramic green sheets and the second ceramic green sheets each include a ceramic material, a binder resin, and a dispersing agent, and a dispersing agent included in one of the first ceramic green sheets that is to be formed into the first-layer ceramic green sheet, is preferably a sterically hindered dispersing agent.

According to various preferred embodiments of the present invention, in the first-layer ceramic green sheet, the binder amount at the open surface opposite to the surface at the carrier film side is increased, and hence, the adhesion at the open surface is increased. Accordingly, the adhesion between the sheet placed on the supporting member and the first-layer ceramic green sheet is increased, and the occurrence of bubble trapping caused by the first-layer ceramic green sheet is prevented, so that the generation of short-circuiting defects caused by the bubble trapping can be prevented.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, examples of a method for manufacturing a multilayer ceramic electronic component and a multilayer ceramic electronic component, according to preferred embodiments of the present invention, will be described with reference to the accompanying drawings.

Figure 1:
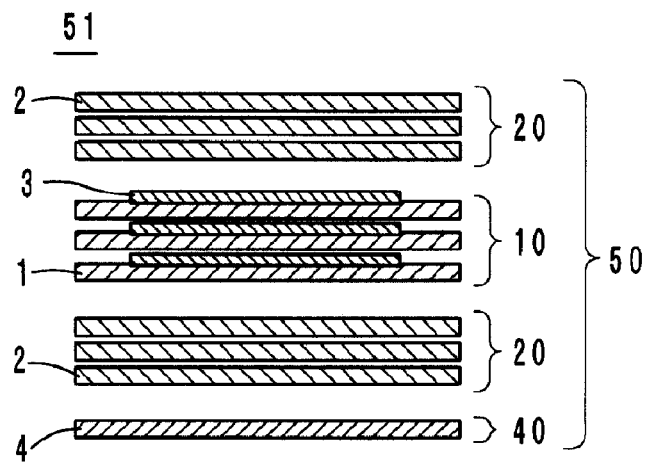
FIG. 1 is an exploded structural view showing a preferred embodiment of a multilayer ceramic electronic component according to the present invention.
Figure 2:
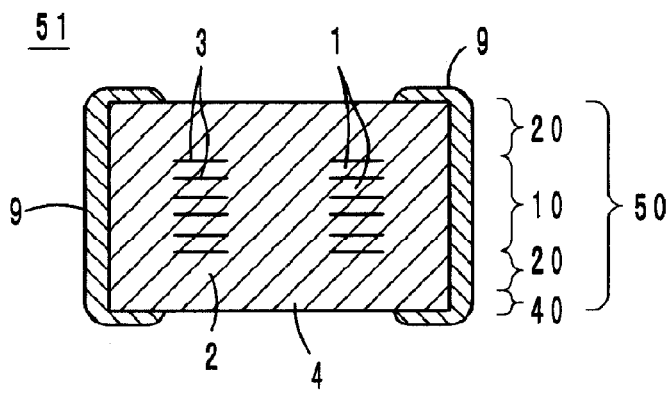
FIG. 2 is a schematic cross-sectional view of the multilayer ceramic electronic component shown in FIG. 1.

FIG. 1 shows an exploded structure of a multilayer ceramic electronic component 51, and FIG. 2 shows a schematic cross-section thereof. The multilayer ceramic electronic component 51 roughly has an inner layer portion 10, outer layer portions 20, and an external layer portion 40 to be adhered to a sheet 5 (which will be described later) placed on a supporting member.

The inner layer portion 10 is formed by laminating inner layer ceramic green sheets 1 provided with internal electrodes 3 thereon. The outer layer portion 20 is formed by laminating outer layer ceramic green sheets 2 provided with no electrodes thereon. The external layer portion 40 is formed of a first-layer ceramic green sheet 4 to be adhered to the sheet 5 placed on the supporting member.

Next, a method for manufacturing the multilayer ceramic electronic component 51 will be described. First, with respect to a magnetic ceramic powder such as NiCuZn ferrite, about 2 percent by weight of a dispersing agent and about 50 percent by weight of purified water, for example, are added to this magnetic ceramic powder and are then sufficiently mixed and pulverized using zirconia balls so that a magnetic ceramic having an average particle diameter of approximately 0.57 μm is obtained, thereby forming a primary ceramic slurry.

With respect to the above magnetic ceramic powder, about 30 percent by weight of a binder resin (acrylic copolymer) and about 1.5 percent by weight of a plasticizer (dibutyl phthalate), for example, are added to the primary ceramic slurry and are then sufficiently mixed together, so that a secondary ceramic slurry is obtained.

This secondary ceramic slurry is applied on resin-made carrier films by a doctor blade method to have a thickness of about 35 μm to about 50 μm, for example, after drying. Next, by drying, ceramic green sheets are formed.

In this method, for the inner layer ceramic green sheets 1 and the outer layer ceramic green sheets 2, as a dispersing agent, an anionic dispersing agent, such as an ammonium polycarboxylate salt, may be used. In the ceramic green sheets 1 and 2, the particles and the binder are uniformly dispersed, and compared to a C concentration (substantially indicates a volume fraction of the binder) at a surface at a carrier film side supported by a carrier film 6 (see FIG. 3), a C concentration at an open surface opposite to the surface at the carrier film side is about 0.8 to 1.2 times.

In addition, for the first-layer external layer ceramic green sheet 4, as a dispersing agent, for example, a sterically hindered dispersing agent, such as an aryl ether polymer, preferably is used. When the sterically hindered dispersing agent is used, the dispersing agent is dispersed as if to form a network among the ceramic particles, and hence free movement of the binder is suppressed, so that the binder and the ceramic powder are not easily mixed with each other. In addition, the binder segregates at the upper side since it is light in weight, and as a result, the C concentration changes in the thickness direction. More particularly, compared to the C concentration at the surface at the carrier film side supported by the carrier film 6, the C concentration at the open surface opposite to the surface at the carrier film side is about 1.5 to 4.0 times.

In addition, as a method for changing the C concentration, besides the method for changing the type of dispersing agent, a method for changing the type of binder or the combination among binders may also be used.

Furthermore, an electrode paste including Ag is applied to surfaces of the inner layer ceramic green sheets 1 by screen printing to form the internal electrodes 3.

Figure 3:
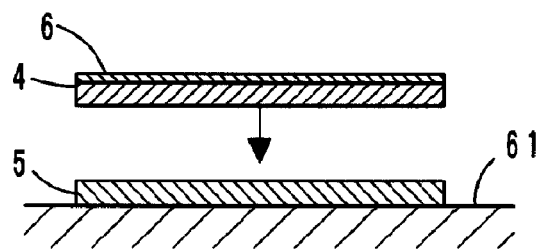
FIG. 3 is a view showing a preferred embodiment of a method for manufacturing the multilayer ceramic electronic component according to the present invention.

Next, as shown in FIG. 3, the external layer ceramic green sheet 4 is pressure-bonded to the sheet 5 (such as a good quality paper having a rough surface) placed on a supporting member 61, and the carrier film 6 is then peeled off to form the first-layer ceramic green sheet.

Figure 4:
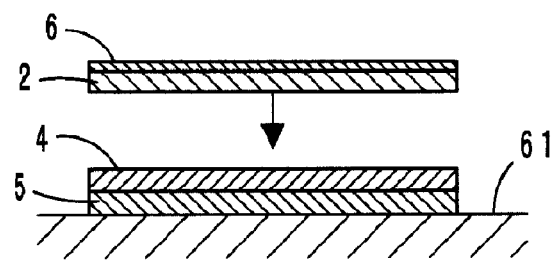
FIG. 4 is a view illustrating a manufacturing method following that shown in FIG. 3.
Figure 5:
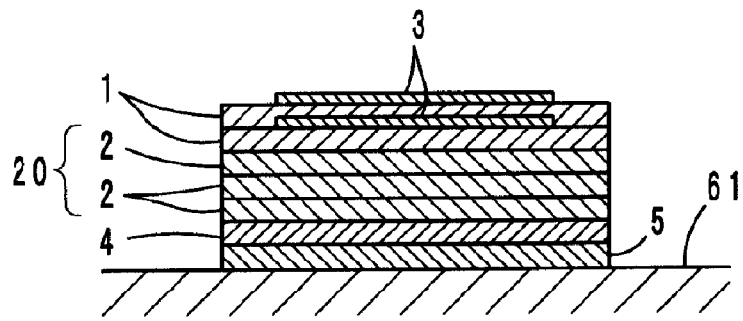
FIG. 5 is a view illustrating a manufacturing method following that shown in FIG. 4.

Subsequently, as shown in FIG. 4, some of the outer layer ceramic green sheets 2 are sequentially pressure-boned on the first-layer ceramic green sheet 4, followed by peeling off their carrier films 6, so that one outer layer portion 20 is formed. In addition, as shown in FIG. 5, to the one outer layer portion 20, the inner layer ceramic green sheets 1 are sequentially pressure-bonded, followed by peeling off their carrier films 6, so that the inner layer portion 10 is formed. Furthermore, the other outer layer ceramic green sheets 2 are sequentially pressure-boned, followed by peeling off their carrier films 6, so that the other outer layer portion 20 is formed. As a result, a laminate 50 is formed.

Subsequently, after the sheet 5 is peeled off from the laminate 50, the laminate 50 is processed by final pressure-bonding at a pressure of about 100 MPa, for example. In addition, the laminate thus processed is cut into a predetermined product size, followed by de-binding and firing, so that a sintered body is obtained. After this sintered body is processed by barrel polishing, external electrodes 9 are formed on two end portions of the sintered body so as to be electrically connected to the respective internal electrodes 3. As a result, the multilayer ceramic electronic component 51 as shown in FIG. 2 is obtained.

Table 1 shows test results obtained when the volume fraction of the binder in the first-layer ceramic green sheet 4 of the multilayer ceramic electronic component 51 is changed.

TABLE 1

| Sample No. | C concentration ratio of ceramic green sheet 4 | C concentration ratio of ceramic green sheet 2 | Particle concentration ratio (surface/inside) | Appearance of laminate | Short-circuiting defect | Solder explosion | |
|---|---|---|---|---|---|---|---|
| 1 | 0.8 | 1.0 | 0.99 | Bubble trapping | 5% | 0% | Comparative example |
| 2 | 1.0 | 1.0 | 0.99 | Bubble trapping | 4% | 0% | Comparative example |
| 3 | 1.2 | 1.0 | 0.95 | Bubble trapping | 3% | 0% | Comparative example |

TABLE 1-continued

| Sample No. | C concentration ratio of ceramic green sheet 4 | C concentration ratio of ceramic green sheet 2 | Particle concentration ratio (surface/inside) | Appearance of laminate | Short-circuiting defect | Solder explosion | |
|---|---|---|---|---|---|---|---|
| 4  | 1.5 | 0.8 | 0.80 | good           | 0% | 0%   | Invention example |
| 5  | 1.5 | 1.0 | 0.86 | good           | 0% | 0%   | Invention example |
| 6  | 1.5 | 1.2 | 0.90 | good           | 0% | 0%   | Invention example |
| 7  | 2.0 | 1.0 | 0.78 | good           | 0% | 0%   | Invention example |
| 8  | 2.5 | 1.0 | 0.67 | good           | 0% | 0%   | Invention example |
| 9  | 3.0 | 1.0 | 0.58 | good           | 0% | 0%   | Invention example |
| 10 | 3.5 | 1.0 | 0.50 | good           | 0% | 0%   | Invention example |
| 11 | 4.0 | 0.8 | 0.45 | good           | 0% | 0%   | Invention example |
| 12 | 4.0 | 1.0 | 0.48 | good           | 0% | 0%   | Invention example |
| 13 | 4.0 | 1.2 | 0.50 | good           | 0% | 0%   | Invention example |
| 14 | 4.5 | 1.0 | 0.41 | Sheet Peeling  | 0% | 0%   | Invention example |
| 15 | 1.5 | 1.5 | 1.01 | Sintering lines | 0% | 0.5% | Comparative example |
| 16 | 3.0 | 3.0 | 1.01 | Sintering lines | 0% | 2.0% | Comparative example |
| 17 | 4.0 | 4.0 | 1.00 | Sintering lines | 0% | 5.0% | Comparative example |

A C concentration ratio in Table 1 substantially indicates the volume fraction of the binder. Since the most of an organic component is used for the binder, it can be assumed that C=binder holds. In addition, for the C concentration ratio of the ceramic green sheet 4 thus formed, a C detection intensity of the surface at the carrier film side and a C detection intensity of the open surface opposite to the surface at the carrier film side were measured using an EDX analysis, and the ratio of the C concentration at the open surface to that at the surface at the carrier film side was obtained by calculation.

Figure 6:
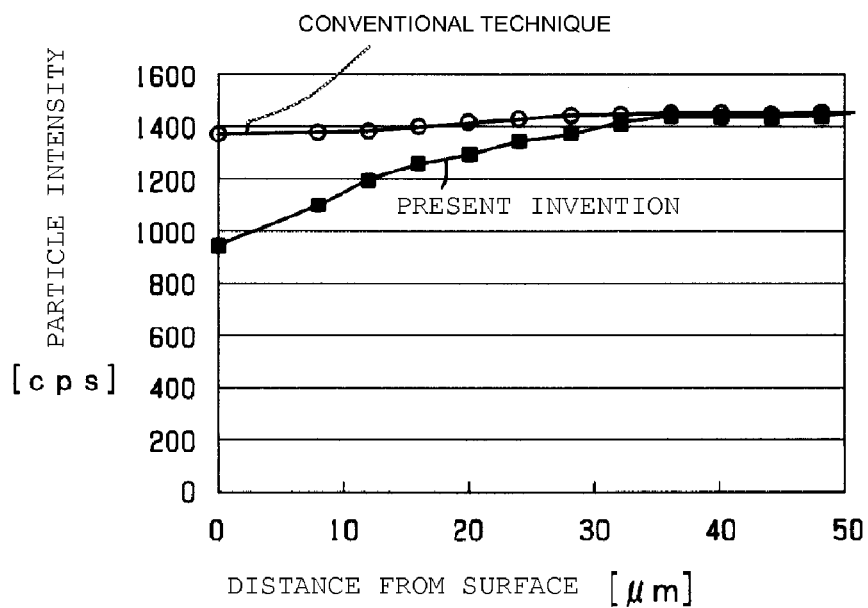
FIG. 6 is a graph showing particle intensity in the thickness direction of a first-layer ceramic green sheet.
Figure 7:
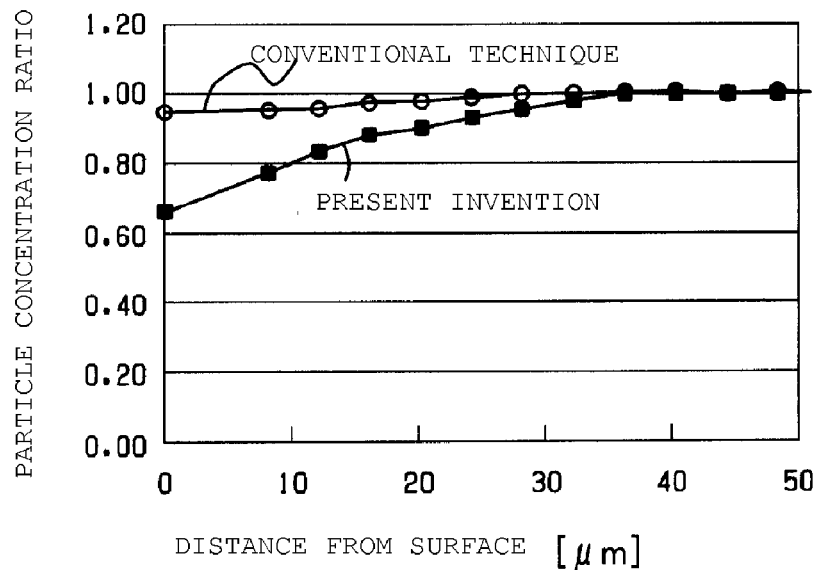
FIG. 7 is a graph showing a particle concentration ratio in the thickness direction of the first-layer ceramic green sheet.

In addition, a particle concentration ratio was measured for the multilayer ceramic electronic component 51, which was processed by horizontal polishing, by a wavelength dispersive x-ray spectrometer, that is, the particle concentration (particle intensity) was evaluated collectively from the molar ratio of the magnetic powder, and amounts of Fe and elements other than Fe in the electronic component 51. That is, the concentration gradient from the surface to the inside was obtained, and a particle concentration where the slope was saturated was regarded as the inside particle concentration. The particle concentration indicates that the surface is porous due to the segregation of the binder. As shown in FIGS. 6 and 7, the slope of the particle concentration is saturated inside at a distance of approximately 35 μm, for example, from the surface. The particle concentration ratio of the surface to the inside is about 0.67, for example. As the particle concentration is increased, the particle intensity is also increased. The size of the multilayer ceramic electronic component 51 preferably is approximately 3.2 mm×1.6 mm×0.85 mm, for example.

In Table 1, in sample Nos. 1, 2, and 3, as the first-layer ceramic green sheet 4, a sheet in which the binder was approximately uniformly dispersed was used. In this case, in sample Nos. 1, 2, and 3, bubble trapping occurred between the sheet 5 and the ceramic green sheet 4. The reason for this is believed that the adhesion between the sheet 5 and the ceramic green sheet 4 is weak.

In sample Nos. 15, 16, and 17, in order to use ceramic green sheets having the same specification for the laminate 50, as the ceramic green sheets 1 and 2, sheets in which the binder was segregated were used. In this case, on the surface of the electronic component 51 processed by sintering, sintering lines in a stripe pattern were generated. The reason for this is that since the binder amount of the ceramic green sheets 2 and 4 at the surface opposite to that at the carrier film side is large, the binder burnt out by the de-binding and the firing forms marks on the surface of the electronic component, and as a result, the glossiness thereof varies. At a place where the sintering line is generated, the water absorption is increased, and thereby solder explosion may occur. Hence, as the ceramic green sheets 2 and 4, sheets having a C concentration ratio of about 1.5 to 4.0 cannot be used, and it is understood that the binder must be segregated only in the first-layer ceramic green sheet 4.

On the other hand, in sample Nos. 4 to 13, the occurrence of bubble trapping, sheet peeling, and sintering lines were not observed, and short-circuiting defects and solder explosion were suppressed. In addition, in the multilayer ceramic electronic component 51 thus obtained, the particle concentration at least one surface of the laminate 50 was about 0.45 to 0.90 times that inside the laminate 50. That is, in the first-layer ceramic green sheet 4, since the binder amount at the open surface opposite to the surface at the carrier film 6 side was increased, the adhesion of the open surface was increased. Accordingly, since the adhesion between the sheet 5 placed on the supporting member 61 and the first-layer ceramic green sheet 4 was increased, the occurrence of bubble trapping caused thereby was prevented, so that the generation of short-circuiting defects caused by the bubble trapping could be prevented.

In sample No. 14, the occurrence of bubble trapping and sintering lines were not observed, and as a result, short-circuiting defects and solder explosion were prevented. However, when the laminate 50 and the sheet 5 were separated from each other, the first-layer ceramic green sheet 4 was partly peeled away, so that sheet peeling occurred. The reason for this is believed that the adhesion between the sheet 5 and the ceramic green sheet 4 is excessively strong.

Hence, the C concentration ratio is preferably in the range of about 1.5 to 4.0 (sample Nos. 4 to 13), and when the C concentration ratio is set in the range of about 1.5 to 4.0, a multilayer ceramic electronic component can be obtained in which the particle concentration at the surface of the electronic component is about 0.45 to 0.90 times that of the inside thereof.

In addition, the method for manufacturing a multilayer ceramic electronic component and the multilayer ceramic electronic component, according to various preferred embodiments of the present invention, are not limited to the above examples and may be variously modified without departing from the spirit and the scope of the present invention.

For example, as a method for segregating the binder, besides the method using a sterically hindered dispersing agent, a method may also be used which uses a binder having poor compatibility with a ceramic material and/or a dispersing agent. The reason for this is that since the binder is not mixed with the ceramic material, the binder is segregated. As the binder, besides the acrylic copolymer (water soluble acrylic binder), for example, vinyl acetate may also be used.

As has thus been described, preferred embodiments of the present invention are effectively used for multilayer ceramic electronic components, and in particular, the present invention is superior since the occurrence of bubble trapping caused by the first-layer ceramic green sheet can be prevented.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A method for manufacturing a multilayer ceramic electronic component, comprising the steps of:
    forming first ceramic green sheets supported by carrier films;
    forming second ceramic green sheets provided with internal electrodes thereon and supported by carrier films;
    pressure-bonding one of the first ceramic green sheets to a supporting member and then peeling off its carrier film to form a first-layer ceramic green sheet;
    sequentially pressure-bonding the other first ceramic green sheets or the second ceramic green sheets to the first-layer ceramic green sheet and peeling off their carrier films so as to sequentially laminate the first ceramic green sheets and the second ceramic green sheets to form a laminate;
    firing the laminate to form a sintered body; and
    forming external electrodes on surfaces of the sintered body; wherein
    among the first ceramic green sheets, in only the first-layer ceramic green sheet, the amount of a binder is changed in the thickness direction so that the amount at an open surface opposite to a surface at a carrier film side, which is supported by the carrier film, is larger than the amount at the surface at the carrier film side.

2. The method for manufacturing a multilayer ceramic electronic component according to claim 1, wherein a binder concentration of the first-layer ceramic green sheet is changed in the thickness direction so that a C concentration at the open surface opposite to the surface at the carrier film side is about 1.5 to about 4.0 times that at the surface at the carrier film side supported by the carrier film.

3. The method for manufacturing a multilayer ceramic electronic component according to claim 1, wherein a sheet having a rough surface is placed on the supporting member.

4. The method for manufacturing a multilayer ceramic electronic component, according to claim 1, wherein the first ceramic green sheets and the second ceramic green sheets each include a ceramic material, a binder resin, and a dispersing agent, and a dispersing agent included in the one of the first ceramic green sheets that is to be formed into the first-layer ceramic green sheet, is a sterically hindered dispersing agent.

* * * * *